(12) United States Patent
Guo et al.

(10) Patent No.: US 11,765,617 B2
(45) Date of Patent: Sep. 19, 2023

(54) FINER GRANULARITY USER PLANE SECURITY POLICY CONFIGURATION

(71) Applicant: APPLE INC., Cupertino, CA (US)

(72) Inventors: Shu Guo, Beijing (CN); Dawei Zhang, Cupertino, CA (US); Fangli Xu, Beijing (CN); Haijing Hu, Cupertino, CA (US); Huarui Liang, Beijing (CN); Xiangying Yang, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 177 days.

(21) Appl. No.: 17/437,735

(22) PCT Filed: Apr. 30, 2020

(86) PCT No.: PCT/CN2020/088115
§ 371 (c)(1),
(2) Date: Sep. 9, 2021

(87) PCT Pub. No.: WO2021/217563
PCT Pub. Date: Nov. 4, 2021

(65) Prior Publication Data
US 2022/0303823 A1 Sep. 22, 2022

(51) Int. Cl.
*H04W 28/02* (2009.01)
*H04W 76/20* (2018.01)
(Continued)

(52) U.S. Cl.
CPC ..... *H04W 28/0268* (2013.01); *H04W 12/106* (2021.01); *H04W 28/0925* (2020.05); *H04W 76/20* (2018.02)

(58) Field of Classification Search
CPC ............ H04W 28/0268; H04W 76/20; H04W 28/0925; H04W 12/106; H04W 36/00;
(Continued)

(56) References Cited

U.S. PATENT DOCUMENTS

2015/0124748 A1* 5/2015 Park ...................... H04W 72/21
370/329
2018/0124633 A1* 5/2018 Hwang ............... H04W 72/566
(Continued)

FOREIGN PATENT DOCUMENTS

WO       2019191974 A1    10/2019
WO       WO-2019191974 A1 * 10/2019 ......... G06F 21/6209
(Continued)

OTHER PUBLICATIONS

Ericsson, et al., Solution #1 of Key Issue 1: Redundant user plane paths based on dual connectivity, R3-200981, 3GPP RAN3 #107-e, Agenda Item 17.2.4.2 ,Feb. 24-Mar. 6, 2020 ,75 pages.
(Continued)

*Primary Examiner* — Mewale A Ambaye
(74) *Attorney, Agent, or Firm* — Dorsey & Whitney LLP

(57) ABSTRACT

Systems, apparatuses, methods, and program products to provision a user plane (UP) security policy at a granularity level that is per data radio bearer (DRB) within a protocol data unit (PDU) session or per quality of service (QoS) flow within one or more DRB of the PDU session.

20 Claims, 11 Drawing Sheets

(51) Int. Cl.
*H04W 28/08* (2023.01)
*H04W 12/106* (2021.01)

(58) Field of Classification Search
CPC ..... H04W 40/36; H04W 80/12; H04W 80/10; H04W 63/105; H04W 63/141
See application file for complete search history.

(56) References Cited

U.S. PATENT DOCUMENTS

| | | | |
|---|---|---|---|
| 2019/0037631 A1* | 1/2019 | Byun | H04W 76/20 |
| 2019/0215756 A1* | 7/2019 | Park | H04W 76/27 |
| 2020/0053126 A1* | 2/2020 | Nair | H04W 12/08 |

FOREIGN PATENT DOCUMENTS

| | | | |
|---|---|---|---|
| WO | 2020036523 A1 | 2/2020 | |
| WO | 2020053646 A1 | 3/2020 | |

OTHER PUBLICATIONS

PCT/CN2020/088115, et al., International Search Report and Written Opinion, dated Jan. 27, 2021, 9 pages.

* cited by examiner

FINER GRANULARITY USER PLANE SECURITY POLICY CONFIGURATION

TECHNICAL FIELD

This application relates generally to wireless communication systems, and more specifically to security protection of user plane traffic.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)). A next generation eNB (ng-eNB) is an enhanced 4G eNB that connects to the 5C Core network via next generation (NG) interfaces but still uses 4G LTE air interfaces to communicate with a 5G UE. Thus, both the gNB and ng-eNB use the NG interfaces toward the 5G core but use different radio interfaces towards the UE. The gNB and ng-eNB may be linked together via the Xn interface.

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION 5G communication systems include integrity protection of the user plane (UP) between the UE and the gNB. Integrity protection may be resource demanding and not all UEs may be able to support it at the full data rate. Therefore, 5G systems may allow the finer level of UP security policy configuration to make sure those capability limited UE can enable the UP IP. For example, if the UE indicates 64 kilobits per second (kbps) as its maximum data rate for integrity protected traffic, then the network may only turn on integrity protection for UP connections where the data rates are not expected to exceed the 64 kbps limit. However, current implementations apply the same UP security policy to every data radio bearer (DRB) in the same Protocol Data Unit (PDU) session. The UP security policy indicates whether UP confidentiality and/or UP integrity protection is activated or not for the DRBs belonging to the PDU session. In response to UP confidentiality and/or UP integrity protection being activated, a gNB and UE may generate or update a UP encryption key and/or UP integrity protection key and activate UP encryption and/or UP integrity protection for the respective PDU session.

Figure 1:
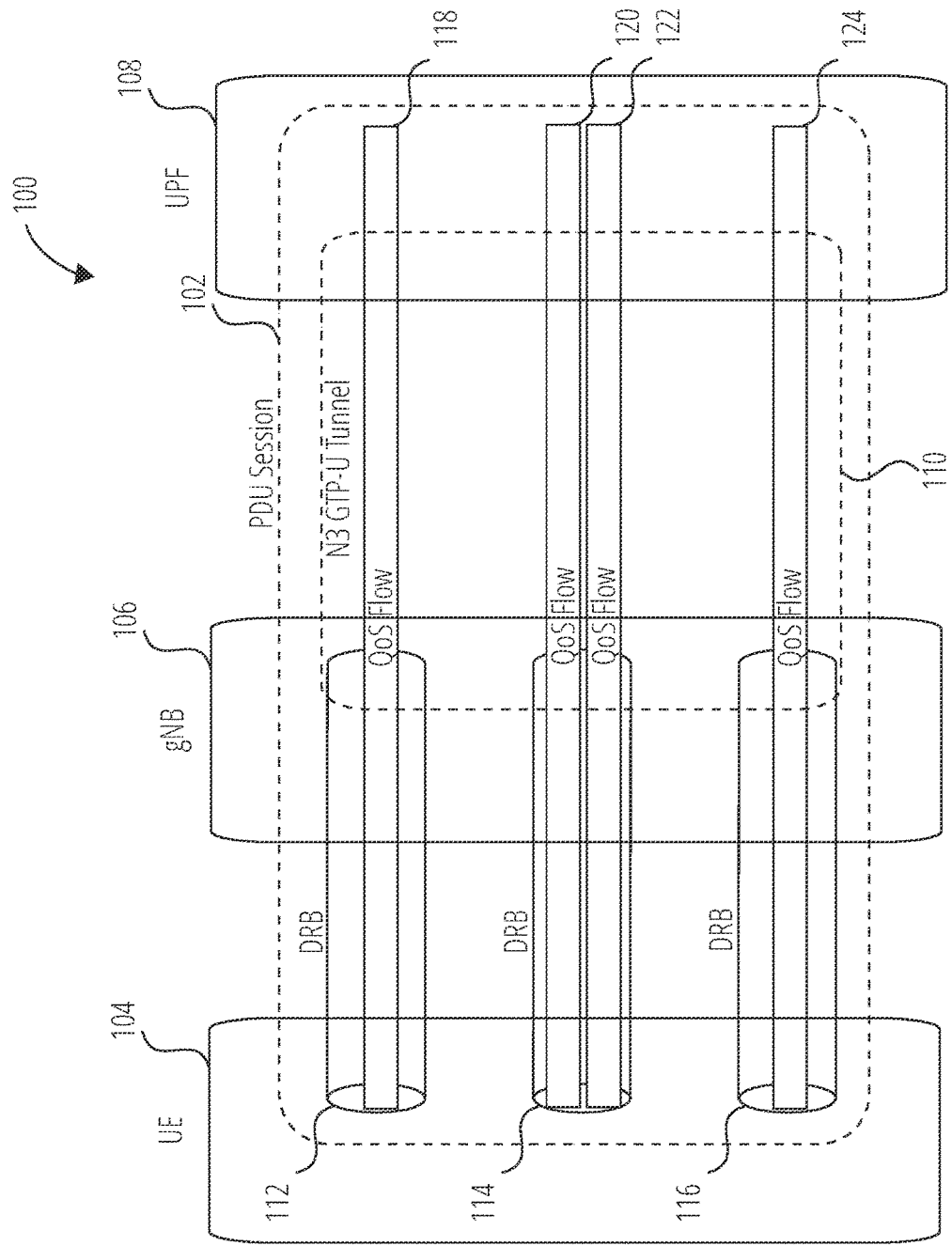
FIG. 1 illustrates a block diagram illustrating an example PDU session.

By way of example, FIG. 1 is a block diagram 100 illustrating a PDU session 102 established by a UE 104, a gNB 106, and a 5G core network. In LTE, Quality of Service (QoS) is enforced at the bearer level and there is a one-to-one relationship for an Evolved Packet System (EPS) bearer between the DRB (UE to eNB), the S1-U General Packet Radio Service (GPRS) Tunneling Protocol (GTP)-U tunnel (eNB to S-GW) and the S5-U tunnel (S-GW to P-GW). In a 5G system, QoS is enforced at a QoS flow level. In a 5G core network, as shown in FIG. 1, a user plane network function (shown as UPF 108) may be configured for transport of data between the gNB 106 and the 5GC. In 5G systems, there is a one-to-many relationship between a N3 GTP-U Tunnel 110 and the DRBs on the air interface (three examples are shown as DRB 112, DRB 114, and DRB 116). A DRB may transport one or more QoS flows (e.g., QoS flow 118, QoS Flow 120, QoS Flow 122, QoS Flow 124). Each QoS flow on N3 is mapped to a single GTP-U tunnel. The gNB 106 may map individual QoS flows to one or more DRB. In the illustrated example, QoS flow 118 is mapped to 112, QoS Flow 120 and 122 are mapped to DRB 114, and QoS Flow 124 is mapped to DRB 116. Therefore, the PDU session 102 includes multiple QoS flows, several DRBs, and a single N3 GTP-U tunnel.

In current 5G systems, UP security policy is only decided by the network and sent from a Session Management Function (SMF) to a gNB or an ng-eNB. For example, 3GPP Technical Specification (TS) 23.502 and TS 33.501 indicate that the SMF provides UP security policy for a PDU session to the ng-eNB/gNB during a PDU session establishment procedure. The ng-eNB/gNB activates UP confidentiality and/or UP integrity protection per each DRB, according to the received UP security policy, using radio resource control (RRC) signaling. Even though the ng-eNB/gNB activates the UP security policy per DRB, since the UP security policy from the SMF is at PDU session granularity, every DRB in the same PDU session will have the same UP security policy.

As indicated above, a UE may have two different kinds of User Plane Integrity Protection (UP IP) capability data rate, 64 kbps and full data rate. In certain embodiments, the UE may send a UE capability message to the network to indicate a UE user plane integrity protection maximum data rate (e.g., 64 kbps or full data rate). The UE capability message may be sent, for example, in a registration request message or another message. When the UE supports full data rate, there may be no issue or difficulty to activate UP IP. However, when the UE can only support 64 kbps for UP IP, it may be difficult to activate UP IP, especially when every DRB in the same PDU session has the same UP security policy. It may be a large burden (i.e., cause packet handling delay, or consume a large amount of power and/or computing resources) for the UE to enable UP IP for all the DRBs in the same PDU session.

Thus, certain embodiments disclosed herein provide systems, apparatuses, methods, and program products to provision UP security policy at a finer granularity even when the UE's UP IP capability is limited, e.g., to 64 kbps. With certain such embodiments, it is possible to only enable the UP IP for some of the DRBs/QoS flows. Thus, the burden caused by the UP IP is reduced.

Figure 2:
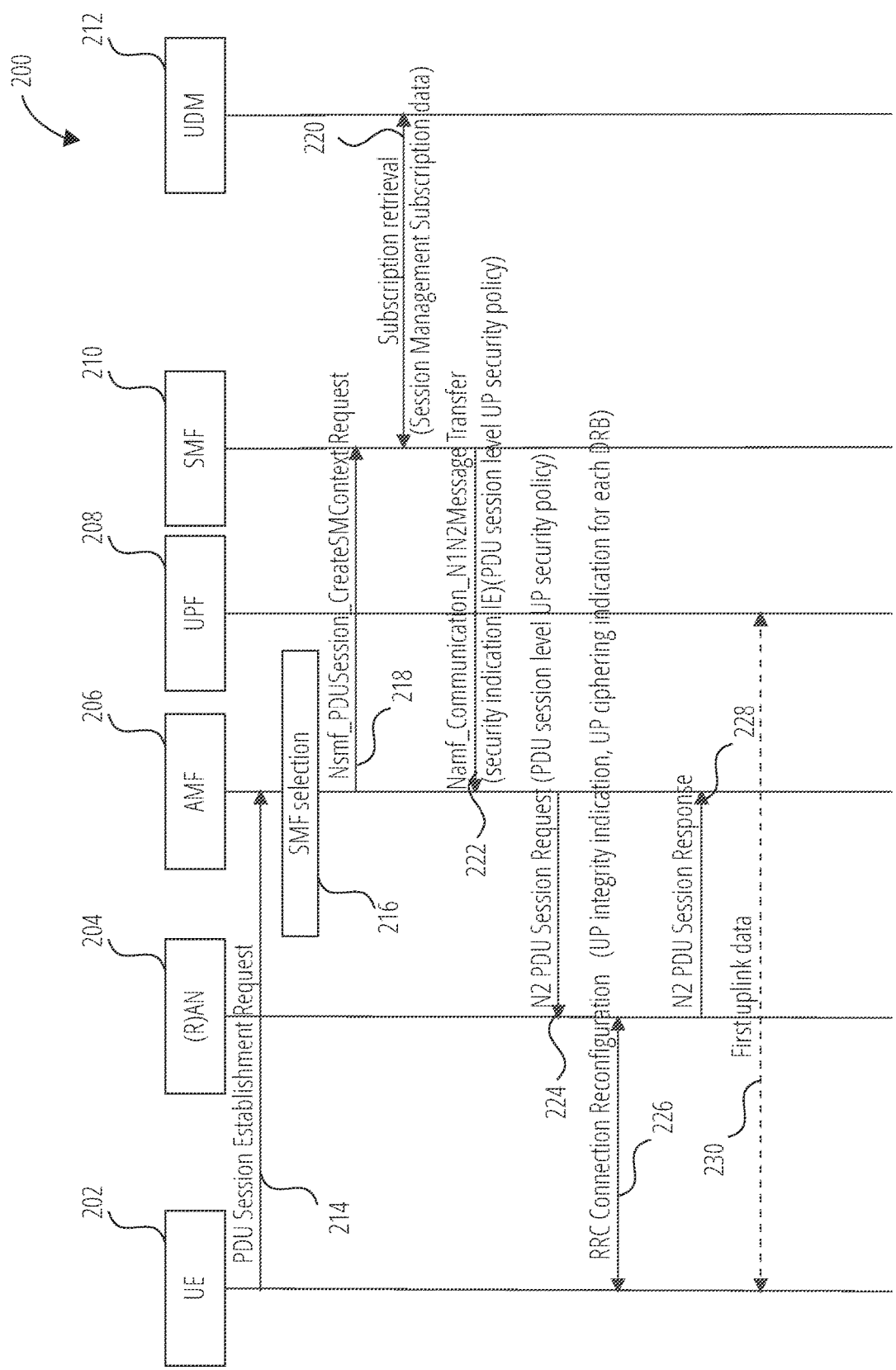
FIG. 2 illustrates a call flow of an example UP policy configuration in a PDU session in accordance with one embodiment.

FIG. 2 is a call flow 200 illustrating an example UP security policy configuration in a PDU session establishment procedure. The call flow 200 includes messages sent between a UE 202, a (radio) access network (shown as (R)AN 204, an access and mobility management function (shown as AMF 206), a user plane function (shown as UPF 208), an SMF 210, and a unified data management function (shown as (UDM) 212). The (R)AN 204 may comprise, for example, a gNB or ng-eNB. Persons skilled in the art will understand that the description herein of the call flow 200 only provides a summary and further details may be found, for example, in 3GPP TS 23.502 and TS 33.501.

The UE 202 initiates the PDU Session Establishment procedure by the transmission of a PDU session establishment request 214 within an N1 Session Management (SM) container to the AMF 206.

The AMF 206 performs SMF selection 216 to select an SMF (e.g., the SMF 210). See, e.g., clause 6.3.2 of 3GPP TS 23.501 and clause 4.3.2.2.3 of 3GPP TS 23.502.

The AMF 206 then sends either an Nsmf_PDUSession_CreateSMContext Request 218 or a Nsmf_PDUSession_UpdateSMContext Request (not shown) to the selected SMF 210. The Nsmf_PDUSession_CreateSMContext Request 218 may include one or more of a Subscription Permanent Identifier (SUPI), a selected Data Network Name (DNN), a UE requested DNN, single network slice selection identifier (S-NSSAI(s)), PDU Session identifier (ID), AMF ID, Request Type, policy control function (PCF) ID, Priority Access, Small Data Rate Control Status, N1 SM container (PDU Session Establishment Request), User location information, Access Type, RAT Type, Permanent Equipment Identifier (PEI), Generic Public Subscription Identifier (GPSI), UE presence in Local Area Data Network (LADN) service area, Subscription For PDU Session Status Notification, DNN Selection Mode, Trace Requirements, Control Plane Cellular Internet of Thing (CIoT) 5G System (5GS) Optimization indication, or Control Plane Only indicator.

If Session Management Subscription data for corresponding SUPI, DNN and S-NSSAI of the Home Public Land Mobile Network (HPLMN) is not available, then the SMF 210 performs subscription retrieval 220 with the UDM 212 to retrieve Session Management Subscription data using Nudm_SDM_Get (SUPI, Session Management Subscription data, selected DNN, S-NSSAI of the HPLMN). The Session Management Subscription data includes the UP security policy.

Although not shown in FIG. 2, the PDU Session Establishment Procedure may include sending, from the SMF 210 to the AMF 206, either Nsmf_PDUSession_CreateSMContext Response (Cause, SM Context ID or N1 SM container (PDU Session Reject(Cause))) or an Nsmf_PDUSession_UpdateSMContext Response. An optional PDU Session authentication/authorization may then be performed. Further, operations may be performed for PCF selection and SM Policy Association Establishment or SMF initiated SM Policy Association Modification, UPF selection, SMF initiated SM Policy Association Modification, and/or N4 Session Establishment/Modification Request and N4 Session Establishment/Modification Response.

The SMF 210 sends Namf_Communication_N1N2Message Transfer 222 to the AMF 206, including an Information Element (IE) "User Plane Security Enforcement information", which indicates the UP security policy. As discussed above, the UP security policy is at the granularity of the PDU session.

The AMF 206 sends an N2 PDU Session Request 224 to the (R)AN 204. The N2 PDU Session Request 224 includes N2 SM information and a non-access stratum (NAS) message (PDU Session ID, N1 SM container (PDU Session Establishment Accept)). The N2 PDU Session Request 224 may also include core network (CN) assisted RAN parameters tuning. The NAS message includes N2 SM information received from the SMF 210. The N2 PDU Session Request 224 includes the UP security policy, which is at the granularity of PDU session.

The (R)AN 204 and the UE 202 then perform an RRC Connection Reconfiguration procedure 226. An RRC Connection Reconfiguration message sent from the (R)AN 204 to the UE 202 includes a UP integrity indication and UP ciphering indication for each DRB. Since the (R)AN 204 (e.g., gNB, ng-eNB or other base station) can only do the configuration per DRB, configuration by the (R)AN 204 is at the granularity of DRB wherein all the DRB in the same PDU session have the same UP security policy. After the UP security activation, the UE 202 sends an RRC Connection Reconfiguration Complete message to the (R)AN 204. The RRC Connection Reconfiguration Complete message is protected with keys for uplink traffic (Kupint and Kupenc).

The (R)AN 204 sends an N2 PDU Session Response 228 to the AMF 206. The N2 PDU Session Response 228 may include one or more of the PDU Session ID, Cause, and N2 SM information. The N2 SM information may include the PDU Session ID, access node (AN) Tunnel Info, a list of accepted/rejected QoS Flow Identifier(s) (QFI(s)), and User Plane Enforcement Policy Notification.

The UE 202 may send first uplink data 230 before continuing with the PDU Session Establishment procedure.

To provide finer granularity for UP security policy configuration, in one embodiment, the SMF 210 configures QoS flow level UP security policy during PDU session establishment. In another embodiment, the SMF 210 configures DRB level UP security policy during PDU session establishment. In another embodiment, the (R)AN 204 configures DRB level UP security policy during PDU session establishment. In another embodiment, the (R)AN 204 configures QoS flow level UP security policy during PDU session establishment. Although the example embodiments are directed to UE initiated PDU Session Establishment procedures. Skilled persons will recognize from the disclosure herein that other PDU Session Establishment procedures may be used such as a UE initiated PDU Session handover between RATs, a UE initiated PDU Session handover from EPS to 5G system, or a network triggered PDU Session Establishment procedure.

Figure 3:
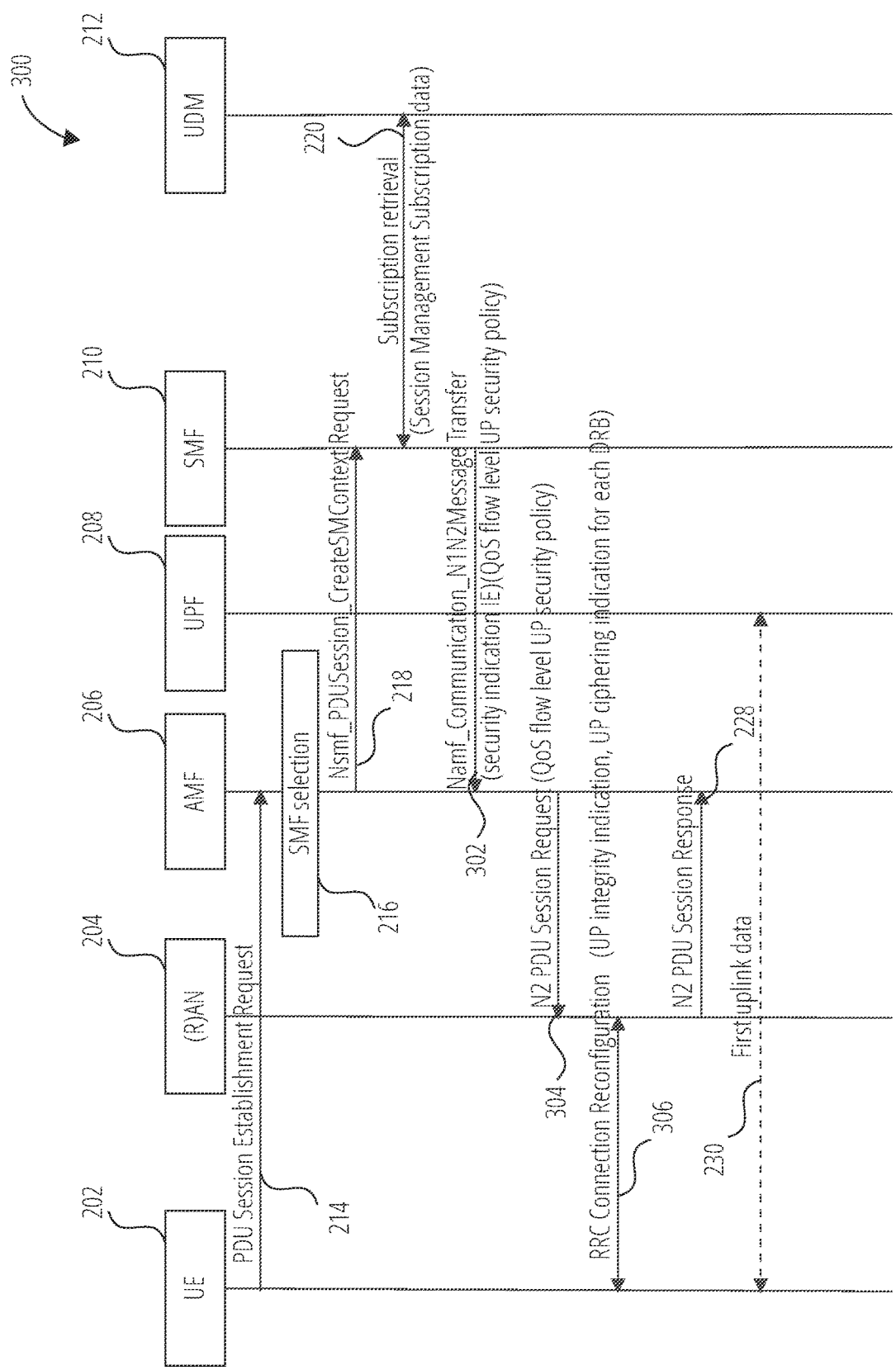
FIG. 3 illustrates a call flow of an SMF configuration of QoS flow level UP security policy in accordance with one embodiment.

FIG. 3 is a call flow 300 illustrating SMF configuration of QoS flow level UP security policy according to one embodiment. The PDU Session Establishment procedure of the call flow 300 is similar to the PDU Session Establishment procedure of the call flow 200 shown in FIG. 2. For example, the PDU session establishment request 214, SMF selection 216, Nsmf_PDUSession_CreateSMContext Request 218, and subscription retrieval 220 may be the same as those discussed above. However, after the subscription retrieval 220, the PDU Session Establishment procedure shown in FIG. 3 includes the SMF 210 sending Namf_Communication_N1N2Message Transfer 302 to the AMF 206, wherein the Namf_Communication_N1N2Message Transfer 302 includes the IE User Plane Security Enforcement Information indicating a UP security policy at the granularity of QoS flow. Thus, the UP security policy may indicate that different QoS have different UP security policies. In certain such embodiments, the UP security policy may be part of QoS rules or QoS profiles. In certain embodiments, the granularity of the UP security policy may be based at least in part on a UE capability message that indicates a UE integrity protection maximum data rate (e.g., 64 kbps or full data rate). In certain embodiments, the UE capability message, or a separate indication by the UE, may include an indication of support for at least one of DRB level UP security policy and QoS flow level UP security policy. In certain such embodiments, when the UE includes the indication of support for at least one of DRB level UP security policy and QoS flow level UP security policy, the network may take the UE's indication of capability into account and use the corresponding level of UP security policy. If no such indication is included in the UE capability message, the network may configure any level of UP security policy and the UE may ignore those levels that it is not configured to handle.

The AMF 206 sends, to the (R)AN 204, a N2 PDU Session Request 304 that includes the UP security policy at the granularity of QoS flow. The N2 PDU Session Request 304 may include N2 SM information and a NAS message (PDU Session ID, N1 SM container (PDU Session Establishment Accept)). The N2 PDU Session Request 304 may also include CN assisted RAN parameters tuning. The NAS message may include N2 SM information received from the SMF 210. Because the UP security policy is at the granularity of QoS flow, the UP security policy may indicate that different QoS flows have different UP security policies. In certain embodiments, the UP security policy may be part of QoS rules or QoS profiles.

The (R)AN 204 and the UE 202 then perform an RRC Connection Reconfiguration procedure 306 An RRC Connection Reconfiguration message sent from the (R)AN 204 to the UE 202 includes a UP integrity indication and UP ciphering indication. In certain embodiments, configuration of the UP security policy by the (R)AN 204 is at the QoS flow level (see FIG. 6) or at the DRB level (see FIG. 5), depending on implementation of the (R)AN 204 (e.g., gNB, ng-eNB, or other base station). After the UP security activation, the UE 202 sends an RRC Connection Reconfiguration Complete message to the (R)AN 204. The RRC Connection Reconfiguration Complete message is protected with keys for uplink traffic (Kupint and Kupenc).

The (R)AN 204 sends an N2 PDU Session Response 228 to the AMF 206. The N2 PDU Session Response 228 may include one or more of the PDU Session ID, Cause, and N2 SM information. The N2 SM information may include the PDU Session ID, access node (AN) Tunnel Info, a list of accepted/rejected QoS Flow Identifier(s) (QFI(s)), and User Plane Enforcement Policy Notification.

With the embodiment shown in FIG. 3, it may be that only some of the QoS flows/DRBs between the UE 202 and the (R)AN 204 are configured with UP IP, which reduces the burden of the UE's consumption of handling the UP IP.

Figure 4:
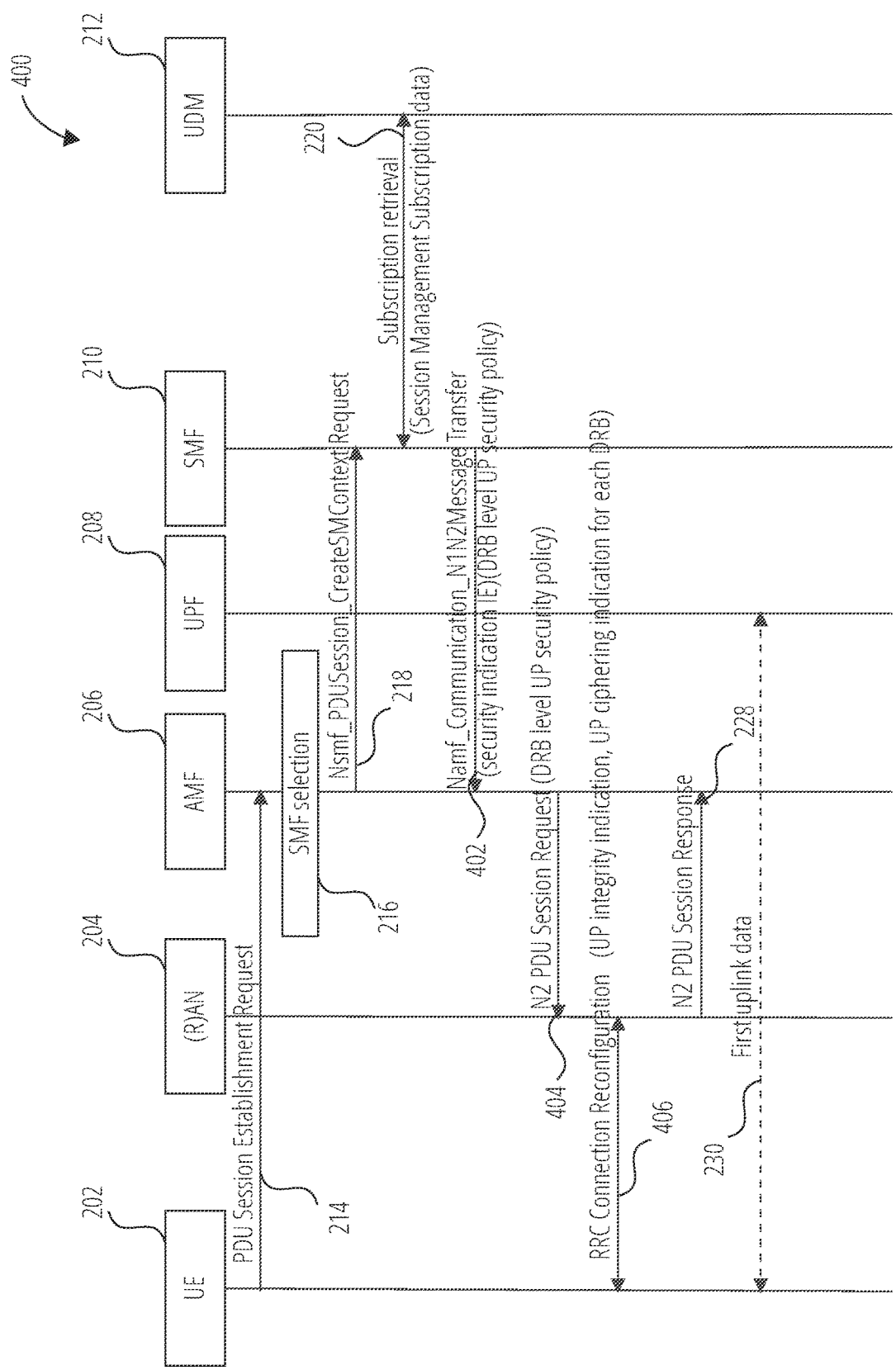
FIG. 4 illustrates a call flow of an SMF configuration of bearer level UP security policy in accordance with one embodiment.

FIG. 4 is a call flow 400 illustrating SMF configuration of DRB level UP security policy according to one embodiment. The PDU Session Establishment procedure of the call flow 400 is similar to the PDU Session Establishment procedure of the call flow 200 shown in FIG. 2. For example, the PDU session establishment request 214, SMF selection 216, Nsmf_PDUSession_CreateSMContext Request 218, and subscription retrieval 220 may be the same as those discussed above. However, after the subscription retrieval 220, the PDU Session Establishment procedure shown in FIG. 4 includes the SMF 210 sending Namf_Communication_N1N2Message Transfer 402 to the AMF 206, wherein the Namf_Communication_N1N2Message Transfer 402 includes the IE User Plane Security Enforcement Information indicating a UP security policy at the granularity of DRB. Thus, the UP security policy may indicate that different DRBs have different UP security policies. In certain embodiments, the granularity of the UP security policy may be based at least in part on a UE capability message that indicates a UE integrity protection maximum data rate (e.g., 64 kbps or full data rate). In certain embodiments, the UE capability message, or a separate indication by the UE, may include an indication of support for at least one of DRB level UP security policy and QoS flow level UP security policy. In certain such embodiments, when the UE includes the indication of support for at least one of DRB level UP security policy and QoS flow level UP security policy, the network may take the UE's indication of capability into account and use the corresponding level of UP security policy. If no such indication is included in the UE capability message, the network may configure any level of UP security policy and the UE may ignore those levels that it is not configured to handle.

The AMF 206 sends, to the (R)AN 204, a N2 PDU Session Request 404 that includes the UP security policy at the granularity of DRB. The N2 PDU Session Request 404 may include N2 SM information and a NAS message (PDU Session ID, N1 SM container (PDU Session Establishment Accept)). The N2 PDU Session Request 404 may also include CN assisted RAN parameters tuning. The NAS message may include N2 SM information received from the SMF 210. Because the UP security policy is at the granularity of DRB, the UP security policy may indicate that different DRBs have different UP security policies.

The (R)AN 204 (e.g., gNB, ng-eNB, or other base station) and the UE 202 then perform an RRC Connection Reconfiguration procedure 406. An RRC Connection Reconfiguration message sent from the (R)AN 204 to the UE 202 includes a UP integrity indication and UP ciphering indication. In certain embodiments, configuration of the UP security policy by the (R)AN 204 is at the QoS flow level (see FIG. 6) or at the DRB level (see FIG. 5), depending on implementation of the (R)AN 204. The (R)AN 204 may determine to map the DRB UP security policy to QoS flow and configure the QoS level UP security policy to the UE 202, or the (R)AN 204 may directly configure the DRB level UP security policy. After the UP security activation, the UE 202 sends an RRC Connection Reconfiguration Complete message to the (R)AN 204. The RRC Connection Reconfiguration Complete message is protected with keys for uplink traffic (Kupint and Kupenc).

The (R)AN 204 sends a N2 PDU Session Response 228 to the AMF 206. The N2 PDU Session Response 228 may include one or more of the PDU Session ID, Cause, and N2 SM information. The N2 SM information may include the PDU Session ID, access node (AN) Tunnel Info, a list of accepted/rejected QoS Flow Identifier(s) (QFI(s)), and User Plane Enforcement Policy Notification.

With the embodiment shown in FIG. 4, it may be that only some of the QoS flows/DRBs between the UE 202 and the (R)AN 204 are configured with UP IP, which reduces the burden of the UE's consumption of handling the UP IP.

Figure 5:
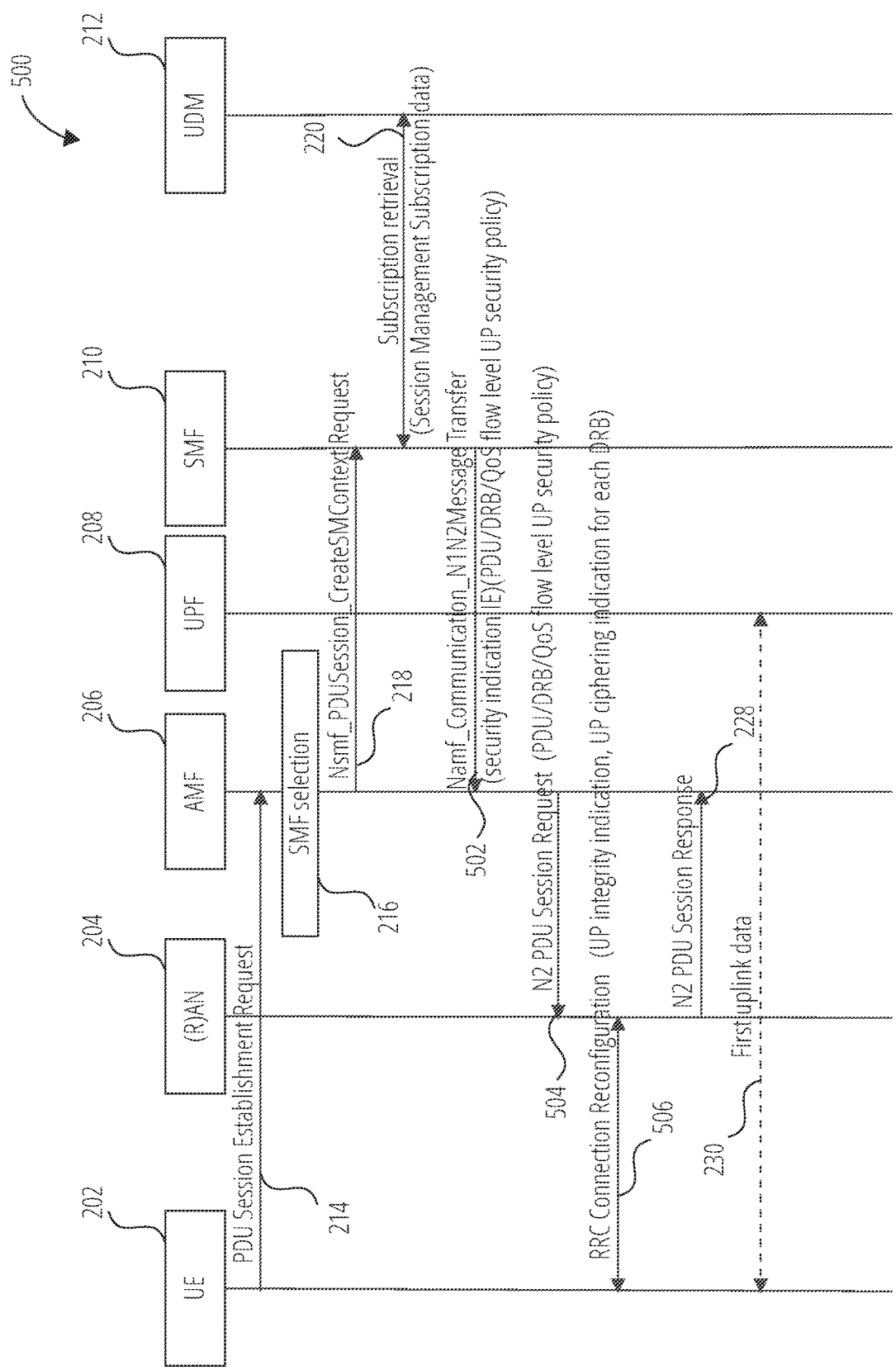
FIG. 5 illustrates a call flow of a (R)AN configuration of bearer level UP security policy in accordance with one embodiment.

FIG. 5 is a call flow 500 illustrating (R)AN 204 (e.g., gNB, ng-eNB, or other base station) configuration of DRB level UP security policy according to one embodiment. The PDU Session Establishment procedure of the call flow 400 is similar to the PDU Session Establishment procedure of the call flow 200 shown in FIG. 2. For example, the PDU session establishment request 214, SMF selection 216, Nsmf_PDUSession_CreateSMContext Request 218, and subscription retrieval 220 may be the same as those discussed above. However, after the subscription retrieval 220, the PDU Session Establishment procedure shown in FIG. 5 includes the SMF 210 sending Namf_Communication_N1N2Message Transfer 502 to the AMF 206, wherein the Namf_Communication_N1N2Message Transfer 502 includes the IE User Plane Security Enforcement Information indicating a UP security policy at the granularity of PDU session, DRB, or QoS flow. In certain embodiments, the granularity of the UP security policy may be based at least in part on a UE capability message that indicates a UE integrity protection maximum data rate (e.g., 64 kbps or full data rate). In certain embodiments, the UE capability message, or a separate indication by the UE, may include an indication of support for at least one of DRB level UP security policy and QoS flow level UP security policy. In certain such embodiments, when the UE includes the indication of support for at least one of DRB level UP security policy and QoS flow level UP security policy, the network may take the UE's indication of capability into account and use the corresponding level of UP security policy. If no such indication is included in the UE capability message, the network may configure any level of UP security policy and the UE may ignore those levels that it is not configured to handle.

The AMF 206 sends, to the (R)AN 204, a N2 PDU Session Request 504 that includes the UP security policy at the granularity of PDU session, DRB, or QoS flow. The N2 PDU Session Request 504 may include N2 SM information and a NAS message (PDU Session ID, N1 SM container (PDU Session Establishment Accept)). The N2 PDU Session Request 504 may also include CN assisted RAN parameters tuning. The NAS message may include N2 SM information received from the SMF 210.

The (R)AN 204 and the UE 202 then perform an RRC Connection Reconfiguration procedure 506. An RRC Connection Reconfiguration message sent from the (R)AN 204 to the UE 202 includes a UP integrity indication and UP ciphering indication for each DRB. When the UP security policy from the SMF 210 is at a PDU session level, the PDU Session Establishment procedure may proceed with the RRC Connection Reconfiguration procedure 226 and the N2 PDU Session Response 228 as discussed above with respect to the call flow 200 shown in FIG. 2. In other words, configuration by the (R)AN 204 is at the granularity of DRB wherein all the DRB in the same PDU session have the same UP security policy.

If, however, the UP security policy from the SMF 210 is at a DRB level, the (R)AN 204 may configure the UE 202 with the DRB level UP security policy.

When the UP security policy from the SMF 210 is at a QoS flow level, the (R)AN 204 may perform mapping from QoS flow to DRB and configure the UE 202 with the DRB level UP security policy. In certain such embodiments, the (R)AN 204 has the capability to determine the UP security policy for every DRB from the given SMF UP security policy.

After the UP security activation, the UE 202 sends an RRC Connection Reconfiguration Complete message to the (R)AN 204. The RRC Connection Reconfiguration Complete message is protected with keys for uplink traffic (Kupint and Kupenc).

The (R)AN 204 sends an N2 PDU Session Response 228 to the AMF 206. The N2 PDU Session Response 228 may include one or more of the PDU Session ID, Cause, and N2 SM information. The N2 SM information may include the PDU Session ID, access node (AN) Tunnel Info, a list of accepted/rejected QoS Flow Identifier(s) (QFI(s)), and User Plane Enforcement Policy Notification.

With the embodiment shown in FIG. 5, it may be that only some of the DRBs between the UE 202 and the (R)AN 204 are configured with UP IP, which reduces the burden of the UE's consumption of handling the UP IP.

Figure 6:
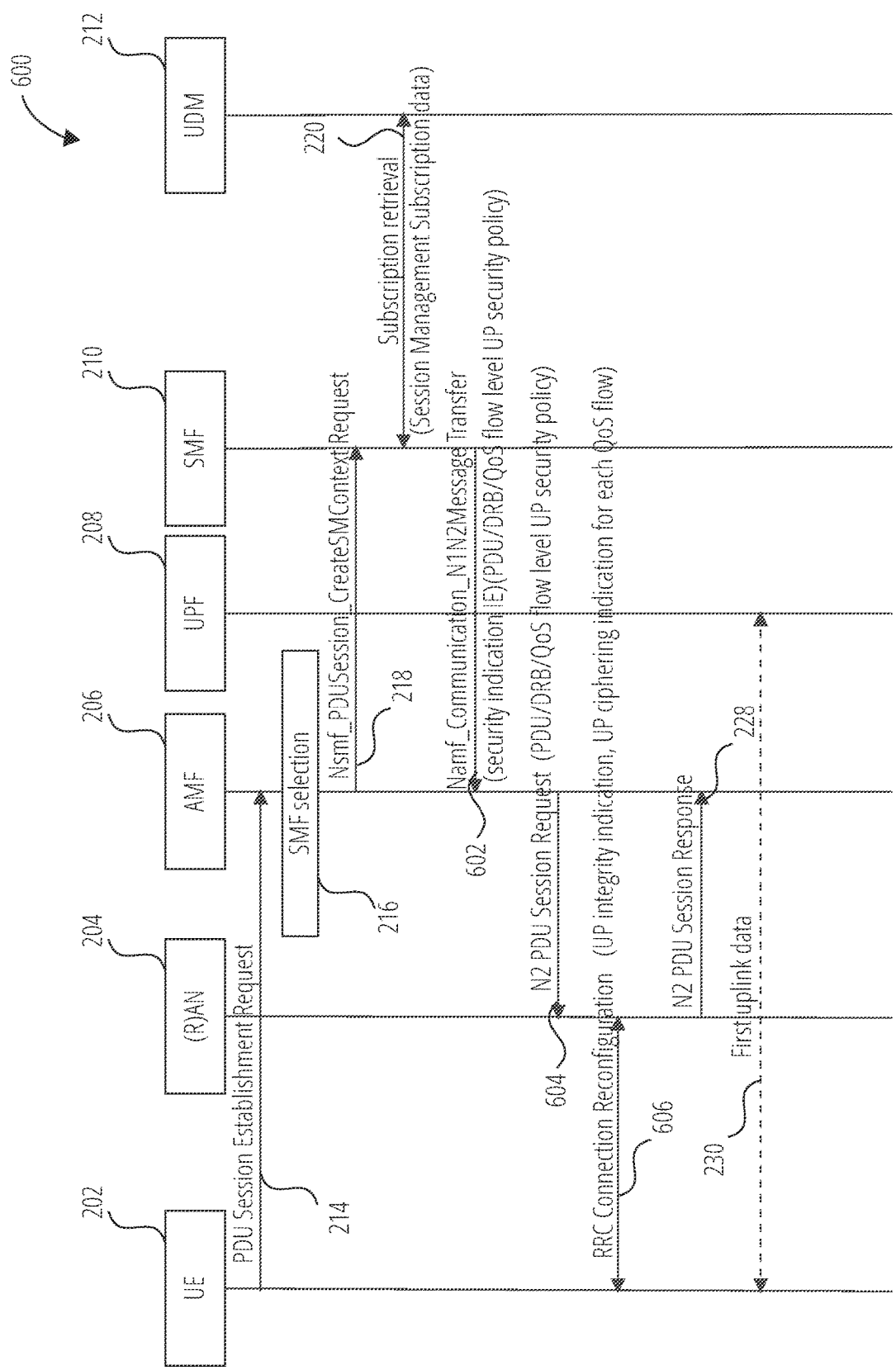
FIG. 6 illustrates a call flow of a (R)AN configuration of QoS flow level UP security policy in accordance with one embodiment.

FIG. 6 is a call flow 600 illustrating (R)AN 204 (e.g., gNB, ng-eNB, or other base station) configuration of QoS flow level UP security policy according to one embodiment. The PDU Session Establishment procedure of the call flow 400 is similar to the PDU Session Establishment procedure of the call flow 200 shown in FIG. 2. For example, the PDU session establishment request 214, SMF selection 216, Nsmf_PDUSession_CreateSMContext Request 218, and subscription retrieval 220 may be the same as those discussed above. However, after the subscription retrieval 220, the PDU Session Establishment procedure shown in FIG. 6 includes the SMF 210 sending Namf_Communication_N1N2Message Transfer 602 to the AMF 206, wherein the Namf_Communication_N1N2Message Transfer 602 includes the IE User Plane Security Enforcement Information indicating a UP security policy at the granularity of PDU session, DRB, or QoS flow. In certain embodiments, the granularity of the UP security policy may be based at least in part on a UE capability message that indicates a UE integrity protection maximum data rate (e.g., 64 kbps or full data rate). In certain embodiments, the UE capability message, or a separate indication by the UE, may include an indication of support for at least one of DRB level UP security policy and QoS flow level UP security policy. In certain such embodiments, when the UE includes the indication of support for at least one of DRB level UP security policy and QoS flow level UP security policy, the network may take the UE's indication of capability into account and use the corresponding level of UP security policy. If no such indication is included in the UE capability message, the network may configure any level of UP security policy and the UE may ignore those levels that it is not configured to handle.

The AMF 206 sends, to the (R)AN 204, a N2 PDU Session Request 604 that includes the UP security policy at the granularity of PDU session, DRB, or QoS flow. The N2 PDU Session Request 604 may include N2 SM information and a NAS message (PDU Session ID, N1 SM container (PDU Session Establishment Accept)). The N2 PDU Session Request 604 may also include CN assisted RAN parameters tuning. The NAS message may include N2 SM information received from the SMF 210.

The (R)AN 204 (e.g., gNB or other base station) and the UE 202 then perform an RRC Connection Reconfiguration procedure 606. An RRC Connection Reconfiguration message sent from the (R)AN 204 to the UE 202 includes a UP integrity indication and UP ciphering indication for each DRB.

When the UP security policy from the SMF 210 is at a PDU session level, the (R)AN 204 may define a finer granularity UP security policy on the QoS flow level, and configure QoS flow level UP security policy for the UE 202.

When the UP security policy from the SMF 210 is at a DRB level, the (R)AN 204 may perform mapping from the DRB level to QoS flow level and configure the QoS level security to the UE 202. In certain such embodiments, The (R)AN 204 has the capability to determine the UP security policy for every QoS flow from the given DRB level UP security policy.

When the UP security policy from the SMF 210 is at a QoS flow level, the (R)AN 204 may configure the QoS level UP security policy to UE 202.

After the UP security activation, the UE 202 sends an RRC Connection Reconfiguration Complete message to the (R)AN 204. The RRC Connection Reconfiguration Complete message is protected with keys for uplink traffic (Kupint and Kupenc).

The (R)AN 204 (e.g., gNB or other base station) sends an N2 PDU Session Response 228 to the AMF 206. The N2 PDU Session Response 228 may include one or more of the PDU Session ID, Cause, and N2 SM information. The N2 SM information may include the PDU Session ID, access node (AN) Tunnel Info, a list of accepted/rejected QoS Flow Identifier(s) (QFI(s)), and User Plane Enforcement Policy Notification.

With the embodiment shown in FIG. 6, it may be that only some of the QoS flows between the UE 202 and the (R)AN 204 (e.g., gNB or other base station) are configured with UP IP, which reduces the burden of the UE's consumption of handling the UP IP.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 7:
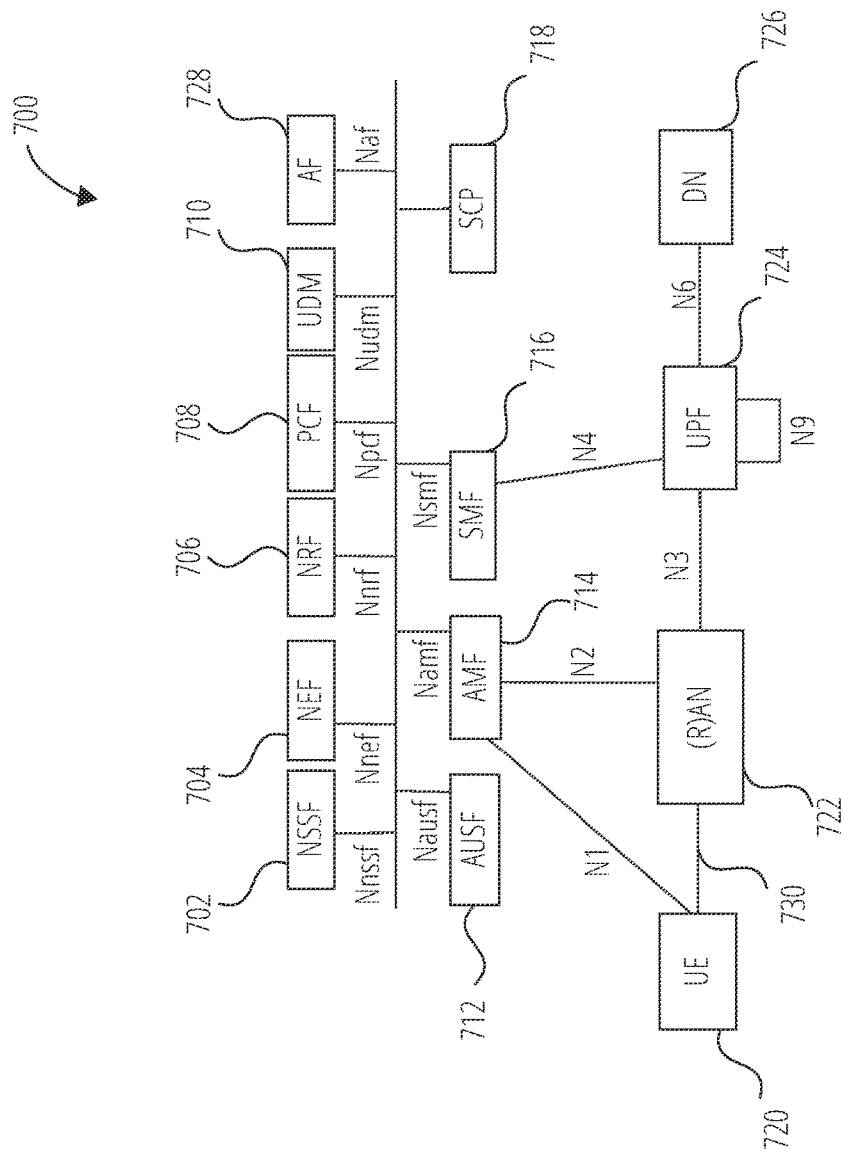
FIG. 7 illustrates an example service based architecture in accordance with certain embodiments.

FIG. 7 illustrates a service based architecture 700 in 5GS according to one embodiment. As described in 3GPP TS 23.501, the service based architecture 700 comprises NFs such as an NSSF 702, a NEF 704, an NRF 706, a PCF 708, a UDM 710, an AUSF 712, an AMF 714, an SMF 716, for communication with a UE 720, a (R)AN 722, a UPF 724, and a DN 726. The NFs and NF services can communicate directly, referred to as Direct Communication, or indirectly via a SCP 718, referred to as Indirect Communication. FIG. 7 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 7 are described below.

The NSSF 702 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 704 supports exposure of capabilities and events. NF capabilities and events may be securely exposed by the NEF 704 (e.g., for 3rd party, Application Functions, and/or Edge Computing). The NEF 704 may store/retrieve information as structured data using a standardized interface (Nudr) to a UDR. The NEF 704 may also secure provision of information from an external application to 3GPP network and may provide for the Application Functions to securely provide information to the 3GPP network (e.g., expected UE behavior, 5GLAN group information, and service specific information), wherein the NEF 704 may authenticate and authorize and assist in throttling the Application Functions. The NEF 704 may provide translation of internal-external information by translating between information exchanged with the AF and information exchanged with the internal network function. For example, the NEF 704 translates between an AF-Service-Identifier and internal 5G Core information such as DNN and S-NSSAI. The NEF 704 may handle masking of network and user sensitive information to external AF's according to the network policy. The NEF 704 may receive information from other network functions (based on exposed capabilities of other network functions), and stores the received information as structured data using a standardized interface to a UDR. The stored information can be accessed and re-exposed by the NEF 704 to other network functions and Application Functions, and used for other purposes such as analytics. For external exposure of services related to specific UE(s), the NEF 704 may reside in the HPLMN. Depending on operator agreements, the NEF 704 in the HPLMN may have interface(s) with NF(s) in the VPLMN. When a UE is capable of switching between EPC and 5GC, an SCEF+NEF may be used for service exposure.

The NRF 706 supports service discovery function by receiving an NF Discovery Request from an NF instance or SCP and providing the information of the discovered NF instances to the NF instance or SCP. The NRF 706 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 708 supports a unified policy framework to govern network behavior. The PCF 708 provides policy rules to Control Plane function(s) to enforce them. The PCF 708 accesses subscription information relevant for policy decisions in a Unified Data Repository (UDR). The PCF 708 may access the UDR located in the same PLMN as the PCF.

The UDM 710 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 710 uses subscription data (including authentication data) that may be stored in a UDR, in which case a UDM implements the application logic and may not require an internal user data storage and several different UDMs may serve the same user in different transactions. The UDM 710 may be located in the HPLMN of the subscribers it serves, and may access the information of the UDR located in the same PLMN.

The AUSF 712 supports authentication for 3GPP access and untrusted non-3GPP access. The AUSF 712 may also provide support for Network Slice-Specific Authentication and Authorization.

The AMF 714 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 714. Regardless of the number of Network functions, in certain embodiments there is only one NAS interface instance per access network between the UE and the CN, terminated at one of the Network functions that implements at least NAS security and Mobility Management. The AMF 714 may also include policy related functionalities.

In addition to the functionalities described above, the AMF 714 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 716 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 716 may include policy related functionalities.

The SCP 718 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 718 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 720 may include a device with radio communication capabilities. For example, the UE 720 may comprise a smartphone (e.g., handheld touchscreen mobile computing devices connectable to one or more cellular networks). The UE 720 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 720 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 720 may be configured to connect or communicatively couple with the (R)AN 722 through a radio interface 730, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 720 and the (R)AN 722 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 722 to the UE 720 and a UL transmission may be from the UE 720 to the (R)AN 722. The UE 720 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 722 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 722 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 722) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 720 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 724 may act as an anchor point for intra-RAT and inter-RAT mobility, an external PDU session point of interconnect to the DN 726, and a branching point to support multi-homed PDU session. The UPF 724 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 724 may include an uplink classifier to support routing traffic flows to a data network. The DN 726 may represent various network operator services, Internet access, or third party services. The DN 726 may include, for example, an application server.

Figure 8:
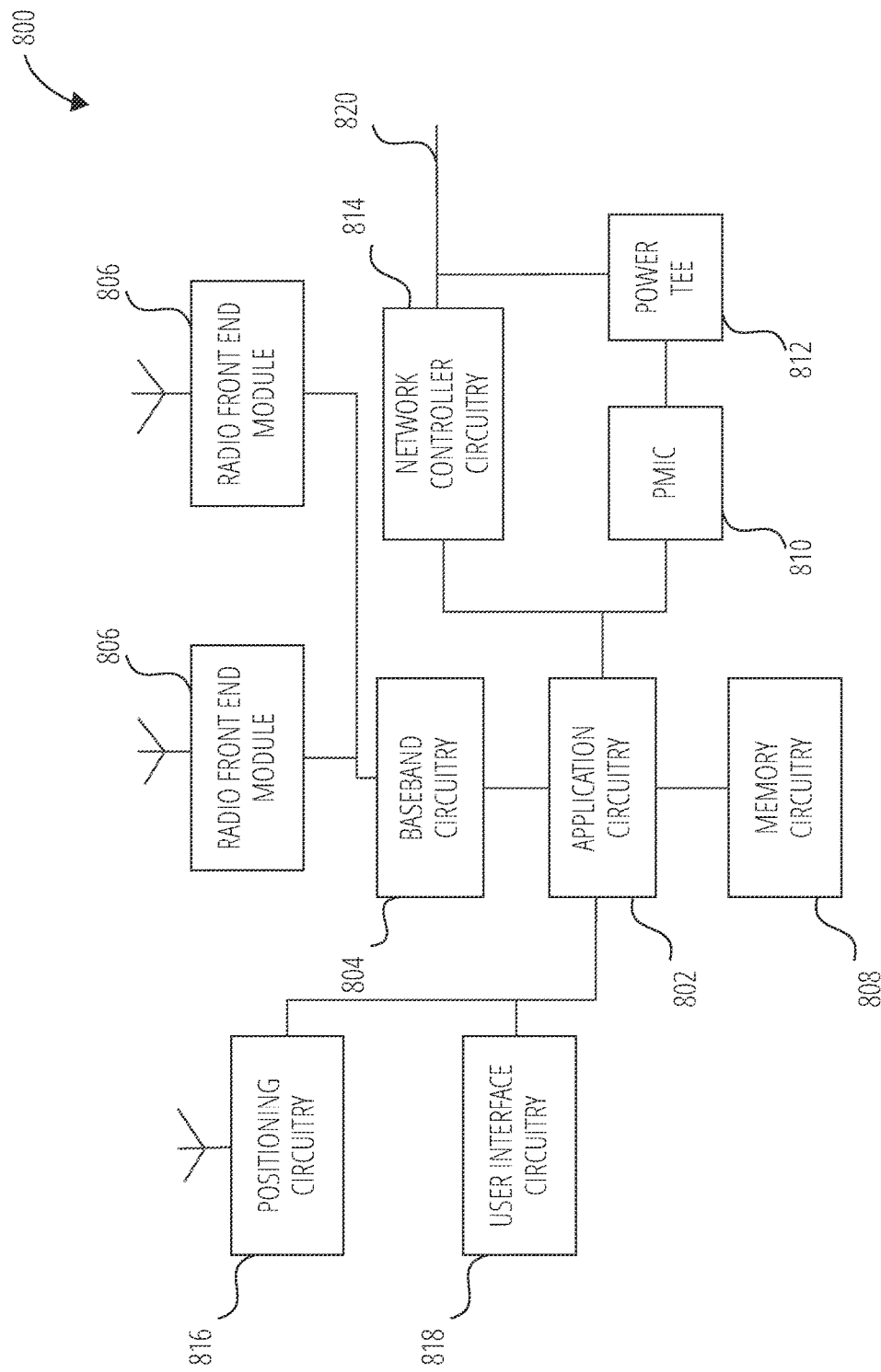
FIG. 8 illustrates an infrastructure equipment in accordance with one embodiment.

FIG. 8 illustrates an example of infrastructure equipment 800 in accordance with various embodiments. The infrastructure equipment 800 may be implemented as a base station, radio head, RAN node, AN, application server, and/or any other element/device discussed herein. In other examples, the infrastructure equipment 800 could be implemented in or by a UE.

The infrastructure equipment 800 includes application circuitry 802, baseband circuitry 804, one or more radio front end module 806 (RFEM), memory circuitry 808, power management integrated circuitry (shown as PMIC 810), power tee circuitry 812, network controller circuitry 814, network interface connector 820, satellite positioning circuitry 816, and user interface circuitry 818. In some embodiments, the device infrastructure equipment 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 802 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 802 may be coupled with or may include memory/storage elements and may be configured to execute instructions stored in the memory/storage to enable various applications or operating systems to run on the infrastructure equipment 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 802 may comprise, or may be, a special-purpose processor/controller to operate according to the various embodiments herein. As examples, the processor(s) of application circuitry 802 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 800 may not utilize application circuitry 802, and instead may include a special-purpose processor/controller to process IP data received from an EPC or 5GC, for example.

In some implementations, the application circuitry 802 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 804 may be implemented, for example, as a solder-down substrate including one or more integrated circuits, a single packaged integrated circuit soldered to a main circuit board or a multi-chip module containing two or more integrated circuits.

The user interface circuitry 818 may include one or more user interfaces designed to enable user interaction with the infrastructure equipment 800 or peripheral component interfaces designed to enable peripheral component interaction with the infrastructure equipment 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mmWave antennas and sub-mmWave.

The memory circuitry 808 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 808 may be implemented as one or more of solder down packaged integrated circuits, socketed memory modules and plug-in memory cards.

The PMIC 810 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 812 may provide for electrical power drawn from a network cable to provide both power supply and data connectivity to the infrastructure equipment 800 using a single cable.

The network controller circuitry 814 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 820 using a physical connection, which may be electrical (commonly referred to as a "copper interconnect"), optical, or wireless. The network controller circuitry 814 may include one or more dedicated processors and/or FPGAs to communicate using one or more of the aforementioned protocols. In some implementations, the network controller circuitry 814 may include multiple controllers to provide connectivity to other networks using the same or different protocols.

The positioning circuitry 816 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 816 may include a Micro-Technology for Positioning, Navigation, and Timing (Micro-PNT) IC that uses a master timing clock to perform position tracking/estimation without GNSS assistance. The positioning circuitry 816 may also be part of, or interact with, the baseband circuitry 804 and/or radio front end module 806 to communicate with the nodes and components of the positioning network. The positioning circuitry 816 may also provide position data and/or time data to the application circuitry 802, which may use the data to synchronize operations with various infrastructure, or the like. The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 9:
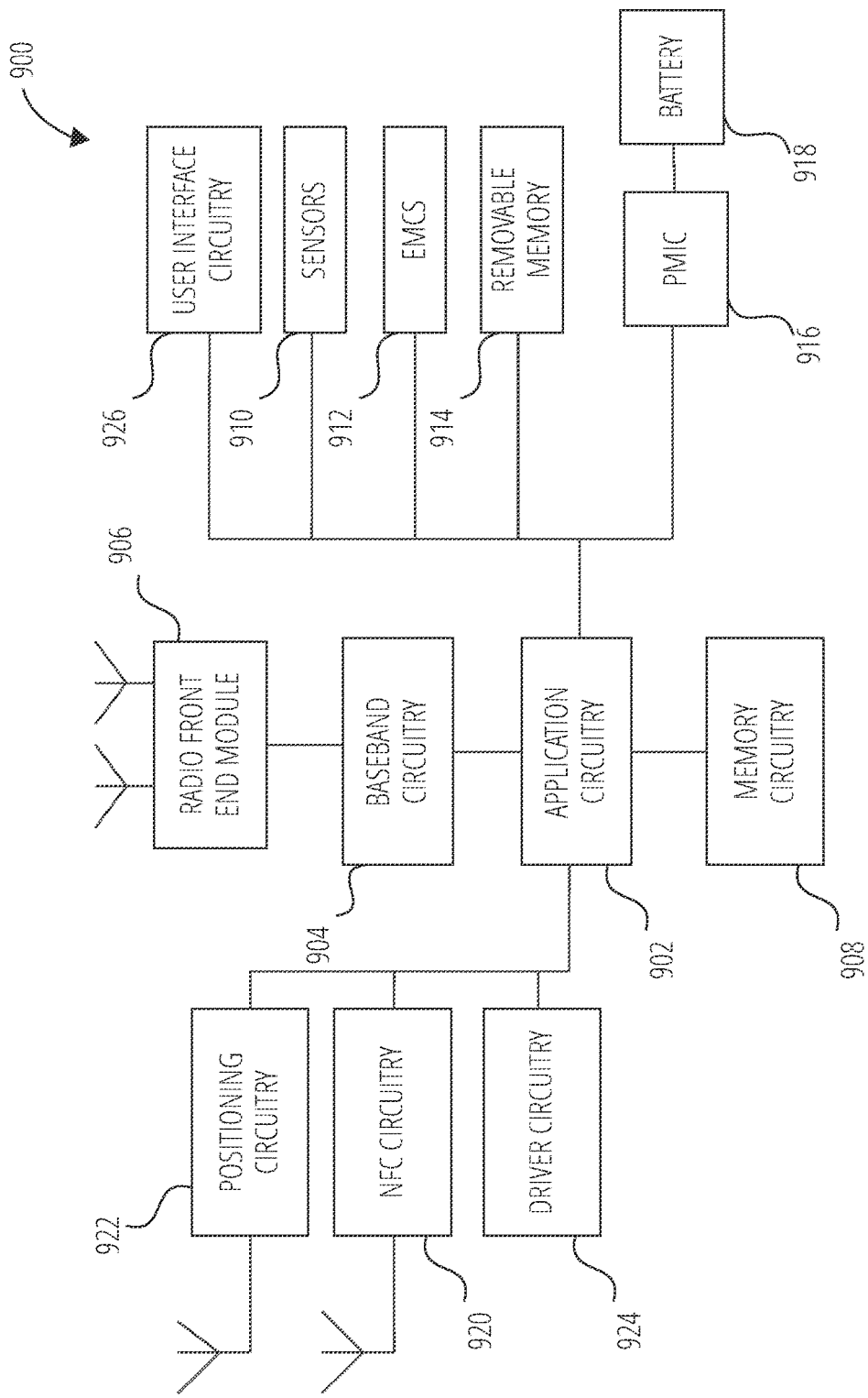
FIG. 9 illustrates a platform in accordance with one embodiment.

FIG. 9 illustrates an example of a platform 900 in accordance with various embodiments. In embodiments, the computer platform 900 may be suitable for use as UEs, application servers, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 902 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 902 may be coupled with or may include memory/storage elements and may be configured to execute instructions stored in the memory/storage to enable various applications or operating systems to run on the platform 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 902 may comprise, or may be, a special-purpose processor/controller to operate according to the various embodiments herein.

As examples, the processor(s) of application circuitry 902 may include an Intel® Architecture Core™ based processor, such as a Quark™, an Atom™, an i3, an i5, an i7, or an MCU-class processor, or another such processor available from Intel® Corporation. The processors of the application circuitry 902 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 902 may be a part of a system on a chip (SoC) in which the application circuitry 902 and other components are formed into a single integrated circuit, or a single package, such as the Edison™ or Galileo™ SoC boards from Intel® Corporation.

Additionally or alternatively, application circuitry 902 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 904 may be implemented, for example, as a solder-down substrate including one or more integrated circuits, a single packaged integrated circuit soldered to a main circuit board or a multi-chip module containing two or more integrated circuits.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include any number and type of memory devices used to provide for a given amount of system memory. As examples, the memory circuitry 908 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 908 may be developed in accordance with a Joint Electron Devices Engineering Council (JEDEC) low power double data rate (LPDDR)-based design, such as LPDDR2, LPDDR3, LPDDR4, or the like. Memory circuitry 908 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 908 may be on-die memory or registers associated with the application circuitry 902. To provide for persistent storage of information such as data, applications, operating systems and so forth, memory circuitry 908 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 900 may incorporate the three-dimensional (3D) cross-point (XPOINT) memories from Intel® and Micron®.

The removable memory 914 may include devices, circuitry, enclosures/housings, ports or receptacles, etc. used to couple portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry include sensors 910 and electro-mechanical components (shown as EMCs 912), as well as removable memory devices coupled to removable memory 914.

The sensors 910 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 912 include devices, modules, or subsystems whose purpose is to enable platform 900 to change its state, position, and/or orientation, or move or control a mechanism or (sub)system. Additionally, EMCs 912 may be configured to generate and send messages/signaling to other components of the platform 900 to indicate a current state of the EMCs 912. Examples of the EMCs 912 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 900 is configured to operate one or more EMCs 912 based on one or more captured events and/or instructions or control signals received from a service provider and/or various clients. In some implementations, the interface circuitry may connect the platform 900 with positioning circuitry 922. The positioning circuitry 922 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 922 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 922 may include a Micro-PNT IC that uses a master timing clock to perform position tracking/estimation without GNSS assistance. The positioning circuitry 922 may also be part of, or interact with, the baseband circuitry 904 and/or radio front end module 906 to communicate with the nodes and components of the positioning network. The positioning circuitry 922 may also provide position data and/or time data to the application circuitry 902, which may use the data to synchronize operations with various infrastructure (e.g., radio base stations), for turn-by-turn navigation applications, or the like.

In some implementations, the interface circuitry may connect the platform 900 with Near-Field Communication circuitry (shown as NFC circuitry 920). The NFC circuitry 920 is configured to provide contactless, short-range communications based on radio frequency identification (RFID) standards, wherein magnetic field induction is used to enable communication between NFC circuitry 920 and NFC-enabled devices external to the platform 900 (e.g., an "NFC touchpoint"). NFC circuitry 920 comprises an NFC controller coupled with an antenna element and a processor coupled with the NFC controller. The NFC controller may be a chip/IC providing NFC functionalities to the NFC circuitry 920 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 920, or initiate data transfer between the NFC circuitry 920 and another active NFC device (e.g., a smartphone or an NFC-enabled POS terminal) that is proximate to the platform 900.

The driver circuitry 924 may include software and hardware elements that operate to control particular devices that are embedded in the platform 900, attached to the platform 900, or otherwise communicatively coupled with the platform 900. The driver circuitry 924 may include individual drivers allowing other components of the platform 900 to interact with or control various input/output (I/O) devices that may be present within, or connected to, the platform 900. For example, driver circuitry 924 may include a display driver to control and allow access to a display device, a touchscreen driver to control and allow access to a touchscreen interface of the platform 900, sensor drivers to obtain sensor readings of sensors 910 and control and allow access to sensors 910, EMC drivers to obtain actuator positions of the EMCs 912 and/or control and allow access to the EMCs 912, a camera driver to control and allow access to an embedded image capture device, audio drivers to control and allow access to one or more audio devices.

The power management integrated circuitry (shown as PMIC 916) (also referred to as "power management circuitry") may manage power provided to various components of the platform 900. In particular, with respect to the baseband circuitry 904, the PMIC 916 may control power-source selection, voltage scaling, battery charging, or DC-to-DC conversion. The PMIC 916 may often be included when the platform 900 is capable of being powered by a battery 918, for example, when the device is included in a UE.

In some embodiments, the PMIC 916 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. If there is no data traffic activity for an extended period of time, then the platform 900 may transition off to an RRC Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 918 may power the platform 900, although in some examples the platform 900 may be mounted deployed in a fixed location, and may have a power supply coupled to an electrical grid. The battery 918 may be a lithium ion battery, a metal-air battery, such as a zinc-air battery, an aluminum-air battery, a lithium-air battery, and the like. In some implementations, such as in V2X applications, the battery 918 may be a typical lead-acid automotive battery.

In some implementations, the battery 918 may be a "smart battery," which includes or is coupled with a Battery Management System (BMS) or battery monitoring integrated circuitry. The BMS may be included in the platform 900 to track the state of charge (SoCh) of the battery 918. The BMS may be used to monitor other parameters of the battery 918 to provide failure predictions, such as the state of health (SoH) and the state of function (SoF) of the battery 918. The BMS may communicate the information of the battery 918 to the application circuitry 902 or other components of the platform 900. The BMS may also include an analog-to-digital (ADC) convertor that allows the application circuitry 902 to directly monitor the voltage of the battery 918 or the current flow from the battery 918. The battery parameters may be used to determine actions that the platform 900 may perform, such as transmission frequency, network operation, sensing frequency, and the like.

A power block, or other power supply coupled to an electrical grid may be coupled with the BMS to charge the battery 918. In some examples, the power block may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 918, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 926 includes various input/output (I/O) devices present within, or connected to, the platform 900, and includes one or more user interfaces designed to enable user interaction with the platform 900 and/or peripheral component interfaces designed to enable peripheral component interaction with the platform 900. The user interface circuitry 926 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 900. The output device circuitry may also include speakers or other audio emitting devices, printer(s), and/or the like. In some embodiments, the sensors 910 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 900 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 10:
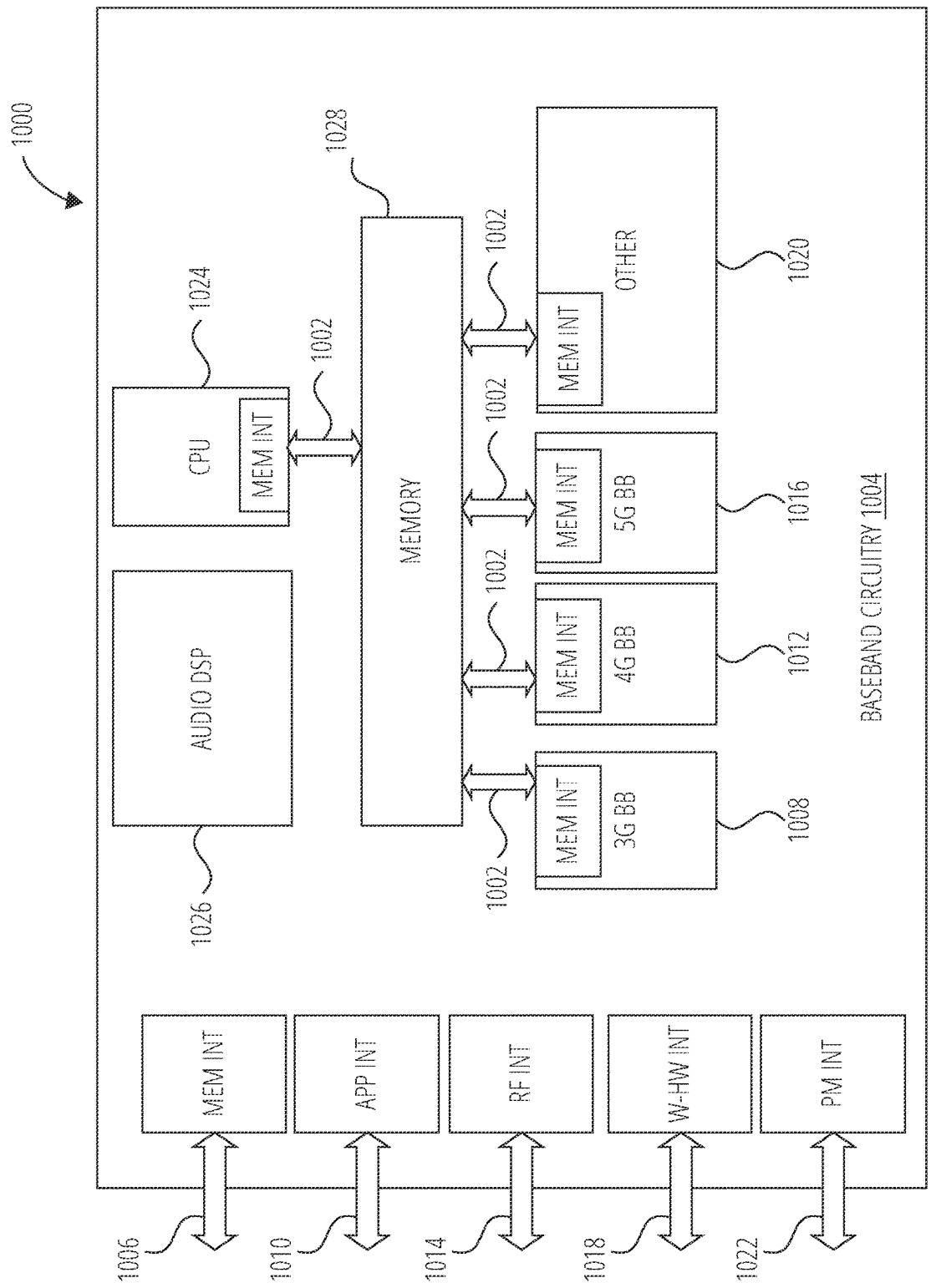
FIG. 10 illustrates example interfaces in accordance with one embodiment.

FIG. 10 illustrates example interfaces 1000 of baseband circuitry in accordance with some embodiments. The baseband circuitry 1004 may comprise 3G baseband processor 1008, 4G baseband processor 1012, 5G baseband processor 1016, other baseband processor(s) 1020, CPU 1024, and a memory 1028 utilized by said processors. As illustrated, each of the processors may include a respective memory interface 1002 to send/receive data to/from the memory 1028.

The baseband circuitry 1004 may further include one or more interfaces to communicatively couple to other circuitries/devices, such as a memory interface 1006 (e.g., an interface to send/receive data to/from memory external to the baseband circuitry 1004), an application circuitry interface 1010 (e.g., an interface to send/receive data to/from the application circuitry), an RF circuitry interface 1014 (e.g., an interface to send/receive data to/from RF circuitry), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1022 (e.g., an interface to send/receive power or control signals to/from a PMC).

Figure 11:
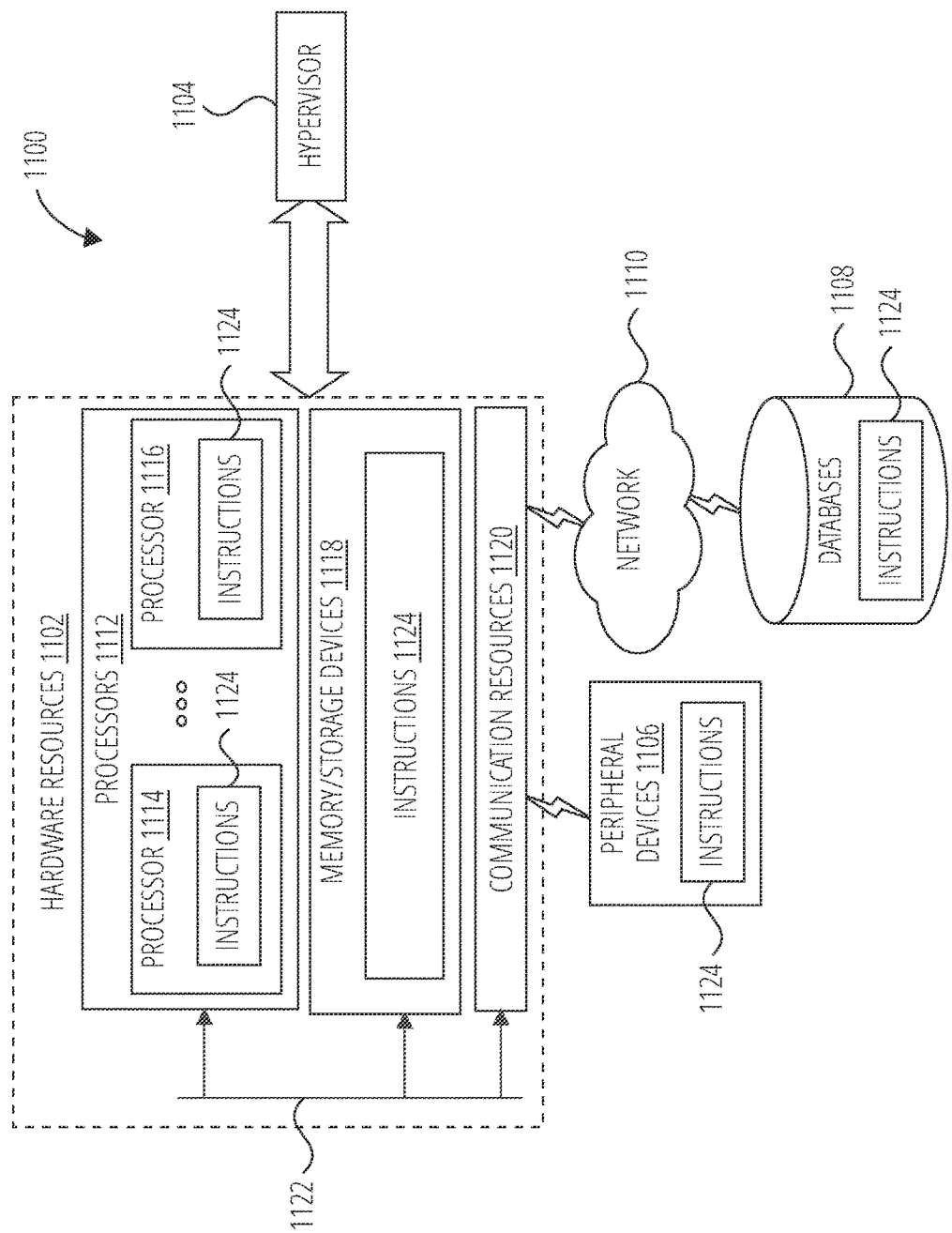
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a computer-readable storage medium. The computer-readable storage medium includes instructions that when executed by a processor of a base station, cause the processor to: perform a protocol data unit (PDU) session establishment procedure with a user equipment (UE) and a core network of a wireless communication system; process, in the PDU session establishment procedure, a user plane (UP) security policy from a network function of the core network to determine a granularity level of the UP security policy; generate a radio resource configuration (RRC) connection reconfiguration message, for the UE, comprising a UP integrity and ciphering indication configured based on the granularity level of the UP security policy; and apply security protection to a subset UP traffic with the UE according to the UP security policy.

Example 2 includes the computer-readable storage medium of Example 1, wherein a portion of the UP traffic is communicated without the security protection based at least in part on the granularity level of the UP security policy.

Example 3 includes the computer-readable storage medium of Example 1 or Example 2, wherein to determine the granularity level of the UP security policy comprises to determine that the UP security policy from the network function is per PDU session, per data radio bearer (DRB) within the PDU session, or per quality of service (QoS) flow within one or more DRB of the PDU session.

Example 4 includes the computer-readable storage medium of Example 3, wherein the instructions further configure the processor to configure a DRB level UP security policy for the UE.

Example 5 includes the computer-readable storage medium of Example 4, wherein the instructions further configure the processor to, when the UP security policy from the network function is per PDU session, configure the UP integrity and ciphering indication for each of the one or more DRB of the PDU session.

Example 6 includes the computer-readable storage medium of Example 4, wherein the instructions further configure the processor to, when the UP security policy from the network function is per DRB within the PDU session, configure a first DRB with a first UP integrity and ciphering indication and a second DRB with a second UP integrity and ciphering indication.

Example 7 includes the computer-readable storage medium of Example 4, wherein the instructions further configure the processor to, when the UP security policy from the network function is per QoS flow: map each QoS flow to the one or more DRB of the PDU session; and configure a first DRB with a first UP integrity and ciphering indication and a second DRB with a second UP integrity and ciphering indication.

Example 8 includes the computer-readable storage medium of Example 7, wherein the instructions further configure the processor to determine, from the UP security policy from the network function, a respective UP security policy for each of the one or more DRB of the PDU session.

Example 9 includes the computer-readable storage medium of Example 3, wherein the instructions further configure the processor to configure a QoS flow level UP security policy for the UE.

Example 10 includes the computer-readable storage medium of Example 9, wherein the instructions further configure the processor to, when the UP security policy from the network function is per PDU session: redefine the granularity level of the UP security policy from the per PDU session to the QoS flow level; and configure the UP integrity and ciphering indication for each QoS flow of the PDU session.

Example 11 includes the computer-readable storage medium of Example 9, wherein the instructions further configure the processor to, when the UP security policy from the network function is per DRB within the PDU session: map each of the one or more DRB to the QoS flow level UP security policy; and configure a first QoS flow with a first UP integrity and ciphering indication and a second QoS flow with a second UP integrity and ciphering indication.

Example 12 includes the computer-readable storage medium of Example 11, wherein the instructions further configure the processor to determine, from the UP security policy from the network function, a respective UP security policy for each QoS flow from the per DRB UP security policy from the network function.

Example 13 includes the computer-readable storage medium of Example 9, wherein the instructions further configure the processor to, when the UP security policy from the network function is per QoS flow, configure a first QoS flow with a first UP integrity and ciphering indication and a second QoS flow with a second UP integrity and ciphering indication.

Example 14 includes the computer-readable storage medium of Example 1, wherein to process the UP security policy from the network function comprises to process the UP security policy from a session management function (SMF) of the core network.

Example 15 is a method for a session management function (SMF) of a core network in a wireless communication system. The method includes: in a protocol data unit (PDU) session establishment procedure, processing session management subscription data for a corresponding user equipment (UE), the session management subscription data including a user plane (UP) security policy for a PDU session of the UE; based at least in part on a maximum data rate of the UE for integrity protected traffic, determining a granularity for applying the UP security policy to the UE; and generating UP security enforcement information to send to an access and mobility management function (AMF) to communicate the UP security policy to a radio access network (RAN) node connected to the UE, the UP security policy indicating the granularity for the RAN node to configure the UP security policy to the UE.

Example 16 includes the method of Example 15, wherein the granularity for applying the UP security policy to the UE is selected from a group comprising per PDU session, per data radio bearer (DRB) within the PDU session, or per quality of service (QoS) flow within one or more DRB of the PDU session.

Example 17 includes the method of Example 16, wherein for the granularity per QoS flow, the UP security policy indicates that different QoS flows have different UP security policies.

Example 18 includes the method of Example 17, wherein the UP security policy is part of one or more QoS rules or QoS profiles for the UE.

Example 19 includes the method of Example 16, wherein for the granularity per DRB, the UP security policy indicates that different DRBs within the PDU session have different UP security policies.

Example 20 is a method for a user equipment (UE). The method includes, in a protocol data unit (PDU) session establishment procedure, processing a radio resource configuration (RRC) connection reconfiguration message from a radio access network (RAN) node, the RRC connection reconfiguration message including a user plane (UP) security policy comprising a granularity level for applying security protection to UP traffic between the UE and the RAN node, the granularity level based at least in part on the UE integrity protection maximum data rate. The method also includes applying the security protection to a subset of the UP traffic with the RAN node according to the UP security policy.

Example 21 includes the method of Example 20, wherein a portion of the UP traffic is communicated without the security protection based at least in part on the granularity level of the UP security policy.

Example 22 includes the method of Example 20 or Example 21, wherein the RRC connection reconfiguration message comprises a UP integrity and ciphering indication configured according to the granularity level, and wherein the granularity level is one of: per PDU session wherein a same UP integrity and ciphering configuration is applied to each data radio bearer (DRB) in the PDU session; per DRB within the PDU session wherein a different UP integrity and ciphering configuration is applied to at least two different DRBs in the PDU session; or per quality of service (QoS) flow wherein a different UP integrity and ciphering configuration is applied to at least two different QoS flows within one or more DRB of the PDU session.

Example 23 includes the method of Example 20 or Example 21, further comprising generating a UE capability message, at the UE for a wireless network, comprising an indication of support for at least one of a data radio bearer (DRB) level user plane (UP) security policy and a quality of service (QoS) flow level UP security policy.

Example 24 may include an apparatus comprising means to perform one or more elements of a method described in or related to any of the above Examples, or any other method or process described herein.

Example 25 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 26 may include an apparatus comprising logic, modules, or circuitry to perform one or more elements of a method described in or related to any of the above Examples, or any other method or process described herein.

Example 27 may include a method, technique, or process as described in or related to any of the above Examples, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 29 may include a signal as described in or related to any of the above Examples, or portions or parts thereof.

Example 30 may include a datagram, packet, frame, segment, protocol data unit (PDU), or message as described in or related to any of the above Examples, or portions or parts thereof, or otherwise described in the present disclosure.

Example 31 may include a signal encoded with data as described in or related to any of the above Examples, or portions or parts thereof, or otherwise described in the present disclosure.

Example 32 may include a signal encoded with a datagram, packet, frame, segment, PDU, or message as described in or related to any of the above Examples, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of the above Examples, or portions thereof Example 34 may include a computer program comprising instructions, wherein execution of the program by a processing element is to cause the processing element to carry out the method, techniques, or process as described in or related to any of the above Examples, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A non-transitory computer-readable storage medium, the non-transitory computer-readable storage medium including instructions that when executed by a processor of a base station, cause the processor to:
   perform a protocol data unit (PDU) session establishment procedure with a user equipment (UE) and a core network of a wireless communication system;
   process, in the PDU session establishment procedure, a user plane (UP) security policy from a network function of the core network to determine a granularity level of the UP security policy;
   generate a radio resource configuration (RRC) connection reconfiguration message, for the UE, comprising a UP integrity and ciphering indication configured based on the granularity level of the UP security policy; and
   apply security protection to a subset UP traffic with the UE according to the UP security policy.

2. The non-transitory computer-readable storage medium of claim 1, wherein a portion of the UP traffic is communicated without the security protection based at least in part on the granularity level of the UP security policy.

3. The non-transitory computer-readable storage medium of claim 1, wherein to determine the granularity level of the UP security policy comprises to determine that the UP security policy from the network function is per PDU session, per data radio bearer (DRB) within the PDU session, or per quality of service (QoS) flow within one or more DRB of the PDU session.

4. The non-transitory computer-readable storage medium of claim 3, wherein the instructions further configure the processor to configure a DRB level UP security policy for the UE.

5. The non-transitory computer-readable storage medium of claim 4, wherein the instructions further configure the processor to, when the UP security policy from the network function is per PDU session, configure the UP integrity and ciphering indication for each of the one or more DRB of the PDU session.

6. The non-transitory computer-readable storage medium of claim 4, wherein the instructions further configure the processor to, when the UP security policy from the network function is per DRB within the PDU session, configure a first DRB with a first UP integrity and ciphering indication and a second DRB with a second UP integrity and ciphering indication.

7. The non-transitory computer-readable storage medium of claim 4, wherein the instructions further configure the processor to, when the UP security policy from the network function is per QoS flow:
   map each QoS flow to the one or more DRB of the PDU session; and
   configure a first DRB with a first UP integrity and ciphering indication and a second DRB with a second UP integrity and ciphering indication.

8. The non-transitory computer-readable storage medium of claim 7, wherein the instructions further configure the processor to determine, from the UP security policy from the network function, a respective UP security policy for each of the one or more DRB of the PDU session.

9. The non-transitory computer-readable storage medium of claim 3, wherein the instructions further configure the processor to configure a QoS flow level UP security policy for the UE.

10. The non-transitory computer-readable storage medium of claim 9, wherein the instructions further configure the processor to, when the UP security policy from the network function is per PDU session:
    redefine the granularity level of the UP security policy from the per PDU session to the QoS flow level; and
    configure the UP integrity and ciphering indication for each QoS flow of the PDU session.

11. The non-transitory computer-readable storage medium of claim 9, wherein the instructions further configure the processor to, when the UP security policy from the network function is per DRB within the PDU session:
    map each of the one or more DRB to the QoS flow level UP security policy; and
    configure a first QoS flow with a first UP integrity and ciphering indication and a second QoS flow with a second UP integrity and ciphering indication.

12. The non-transitory computer-readable storage medium of claim 11, wherein the instructions further configure the processor to determine, from the UP security policy from the network function, a respective UP security policy for each QoS flow from the per DRB UP security policy from the network function.

13. The non-transitory computer-readable storage medium of claim 9, wherein the instructions further configure the processor to, when the UP security policy from the network function is per QoS flow, configure a first QoS flow with a first UP integrity and ciphering indication and a second QoS flow with a second UP integrity and ciphering indication.

14. The non-transitory computer-readable storage medium of claim 1, wherein to process the UP security policy from the network function comprises to process the UP security policy from a session management function (SMF) of the core network.

15. A method for a session management function (SMF) of a core network in a wireless communication system, the method comprising:
    in a protocol data unit (PDU) session establishment procedure, processing session management subscription data for a corresponding user equipment (UE), the session management subscription data including a user plane (UP) security policy for a PDU session of the UE;

based at least in part on a maximum data rate of the UE for integrity protected traffic, determining a granularity for applying the UP security policy to the UE; and generating UP security enforcement information to send to an access and mobility management function (AMF) to communicate the UP security policy to a radio access network (RAN) node connected to the UE, the UP security policy indicating the granularity for the RAN node to configure the UP security policy to the UE.

16. The method of claim 15, wherein the granularity for applying the UP security policy to the UE is selected from a group comprising per PDU session, per data radio bearer (DRB) within the PDU session, or per quality of service (QoS) flow within one or more DRB of the PDU session.

17. The method of claim 16, wherein for the granularity per QoS flow, the UP security policy indicates that different QoS flows have different UP security policies.

18. The method of claim 17, wherein the UP security policy is part of one or more QoS rules or QoS profiles for the UE.

19. The method of claim 16, wherein for the granularity per DRB, the UP security policy indicates that different DRBs within the PDU session have different UP security policies.

20. A method for a user equipment (UE), comprising:

in a protocol data unit (PDU) session establishment procedure, processing a radio resource configuration (RRC) connection reconfiguration message from a radio access network (RAN) node, the RRC connection reconfiguration message including a user plane (UP) security policy comprising a granularity level for applying security protection to UP traffic between the UE and the RAN node, the granularity level based at least in part on the UE integrity protection maximum data rate; and applying the security protection to a subset of the UP traffic with the RAN node according to the UP security policy.

* * * * *